Patented Dec. 5, 1922.

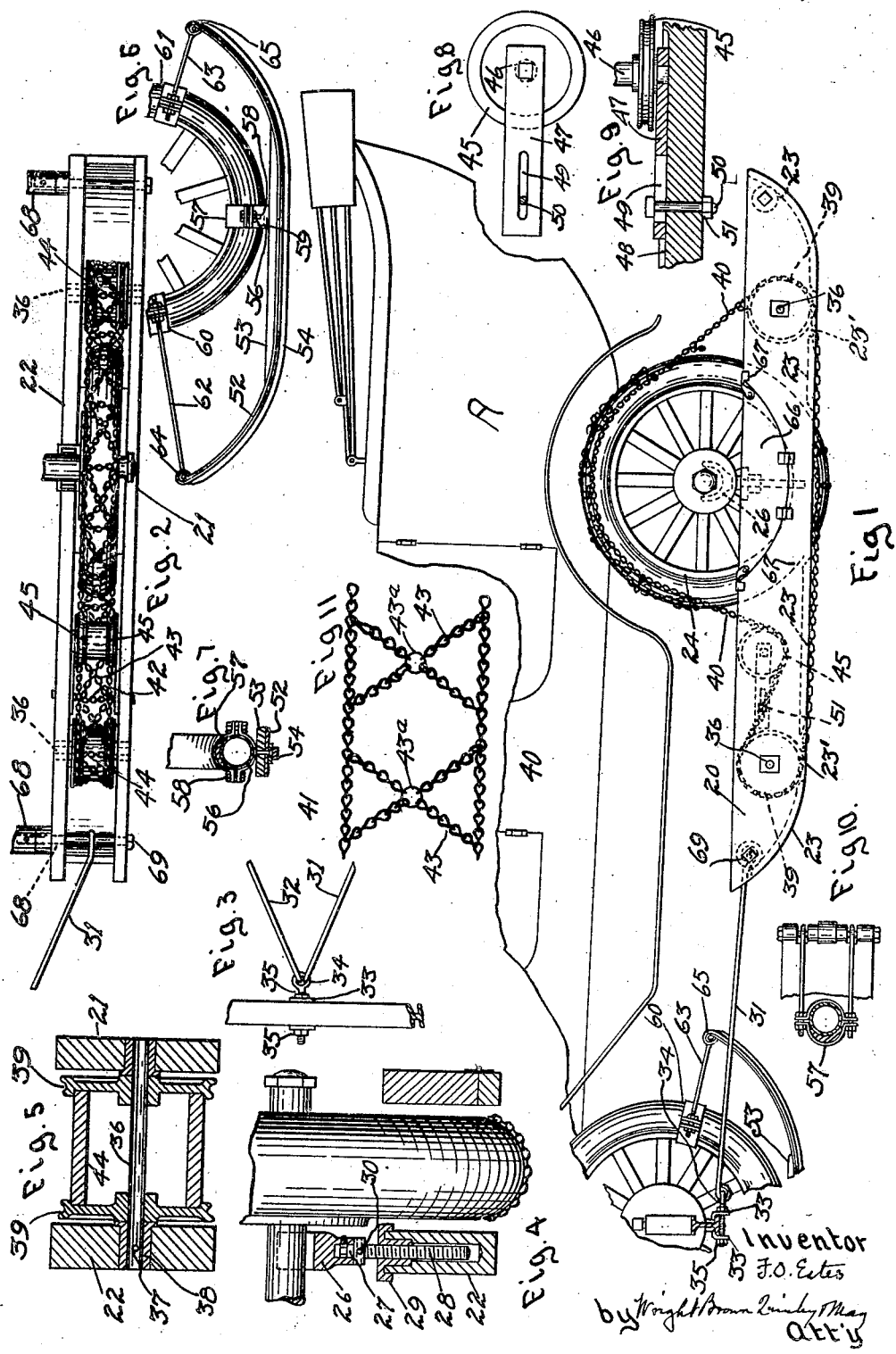

1,437,408

UNITED STATES PATENT OFFICE.

FRANCISCO O. ESTES, OF ARLINGTON, VERMONT.

AUTOMOBILE SLED.

Application filed March 11, 1920. Serial No. 365,109.

*To all whom it may concern:*

Be it known that I, FRANCISCO O. ESTES, a citizen of the United States, residing at Arlington, in the county of Bennington and State of Vermont, have invented new and useful Improvements in Automobile Sleds, of which the following is a specification.

This invention relates to automobiles with runner attachments, adapted to convert the automobile into a motor-driven sleigh or sled for efficient use over snow-covered ground. The objects and accomplishments of the invention have been, among other things, to provide runners for the driving wheels which can be easily and quickly attached at any time, and are constructed and arranged in a manner which enables the driving wheels of the car to furnish the tractive effort, and in connection with which also ample tractive force may be applied to the ground surface; in connection with the foregoing, to provide adjustments suitable for different conditions in the density of the snow; to enable the tires of the driving wheels to be changed without requiring removal of the runners; and to provide in combination with the driving wheels and their associated runners tractor chains of a construction which permits the wheels to bear directly on a hard ground surface.

In the use of this device, forward runners are preferably placed under and rigidly secured to the front wheels of the car and rear runners are engaged with the car beside or embracing the driving wheels, and are arranged to permit the wheels to protrude and supply motive power on hard surfaces by traction in the usual manner; said rear runners resting on the ground surface, but having no supporting function until soft snow is encountered, but then furnishing an additional bearing surface sufficient to support the weight of the car; the chains and other features of my invention serving to provide an exceedingly effective and simple means for propelling where traction would otherwise be impossible.

In the drawings, Figure 1 shows a side view of an automobile with the parts not material to the understanding of my invention omitted. The right front wheel and the left rear wheel are shown.

Figure 2 shows in plan one of the rear runners in place on the rear driving wheel.

Figure 3 is a plan view, showing the method of attachment of the rear runners to the front axle.

Figure 4 is a vertical transverse section, showing the method of attachment of the runner to the rear wheel.

Figure 5 is a transverse vertical section through one of the guide rolls for the driving chain.

Figure 6 shows a front runner and a part of the front wheel to which it is attached, in side elevation.

Figure 7 shows in cross section the bottom of the same runner, the adjacent part of the front wheel and the bottom clamp for securing the runner to the wheel.

Figure 8 shows a side elevation of a device for adjusting the tension of the tractor chain.

Figure 9 shows a horizontal section of the same in its association with the runner.

Figure 10 shows in plan the means for securing the ends of the front runners to the front wheel.

Figure 11 shows a fragment of the form of tractor chain which I prefer to use.

The same reference characters designate the same parts in all the figures.

In the drawings the runner 20 associated with the driving wheel is formed of two members 21 and 22 connected by the shoe sections 23, a space being provided between the sections to permit the wheel 24 of the automobile A to protrude beyond the bottom line of the runner thus formed.

On the inner runner member 22 is mounted rigidly a forked saddle or chair 26 adapted to engage the axle of the driving wheel.

This saddle is swivelled at 27 on the adjusting post 28 threaded in the nut 29 rigidly secured to the runner member 22, the post having a capstan collar 30 to effect vertical adjustment. The forward end of each runner is connected by means of the tie rods 31 and 32 to a suitable connection rigidly secured to the front axle.

A simple connection may be made by means of angle pieces 33 drilled to receive an eye bolt 34, on which are screwed nuts 35 operating to clamp the angle pieces against the opposite sides of the bottom flange of the front axle; the eye bolt being then underneath the axle, and so being secured without need of mutilating the axle in any way.

However, other means to accomplish this purpose may be used without departing from the spirit of my invention. Mounted in the runner members 21—22 is the shaft 36 secured against displacement by means of a pin 37 passing through the shaft and a socket 38 in said runner member.

Rotatably mounted on the shaft 36 are the sheaves 39 adapted to guide the endless chains 40—41 which form the longitudinal members of a tractor and are connected at intervals by cross chains 42 and 43. The cross chains may be either perpendicular to the longitudinal chains, or diagonally arranged, or partly of both characters. Such an arrangement as that shown in Figure 11, where oppositely inclined diagonal cross chains 43 meet and are connected by rings 43ª has been found satisfactory, as it gives sufficient traction in soft snow. Any construction of chain may be used which has sufficient strength and is capable of passing around a sheave without injurious distortion of its links.

The drum 44 is fitted to the sheaves 39 and serves as a guard to prevent snow packing between the sheaves and also to space the sheaves.

One unit pair of sheaves is mounted in front of the wheel, preferably near the front end of the runner, and another similar pair is preferably mounted near the back end, their peripheries being substantially or nearly tangent to the lower surfaces of the runners. The chains pass from the driving wheel around the forward sheaves 39, through the opening 23′, between the shoe sections, along the bottom of the shoe sections, around the rear sheaves 39; and over the driving wheel.

A tension controller for the chain is formed of sheaves 45 connected by a drum similar to 44, and rotatably mounted by the shaft 46 which is held by plates 47 slidably seated in guideways 48 in the inner side faces of the runner members 21, 22. These holder plates are preferably slotted, as indicated at 49, and are adapted to be clamped rigidly in any adjusted position by means of the bolt 50 and nut 51, arranged substantially as shown in Figures 8 and 9.

Each of the front wheels of the automobile is supported on a separate runner which is preferably constructed of a metal strap 52, curved up at its ends, and braced and stiffened at its middle part (which bears on the ground) by a beam or plank 53, made of wood or other sufficiently light and rigid material. A rib or keel member 54 is secured to the strap or body of the runner, or at least to that part which bears on the ground. A clamp 56 is secured to the runner near its middle part for making attachment to the wheel, and is provided with a cap 57 and with connecting bolts 58 and nuts 59. Similar clamps are adapted to engage the wheel at 60, 61, the bolts 62, 63 thereof being extended and formed with eyes to engage pins 64, 65 secured in loops formed in the ends of the runner straps or plates.

Thus each front wheel is secured rigidly in its position on the runner, and, in being turned for steering in the usual manner, turns the runner also. The keel piece on the runner then prevents skidding and causes the car to change direction, due to its penetration into the snow. The construction of the front runner is such that tires may be readily changed or runners removed by releasing the holding clamps.

To provide for changing the tires on the rear wheels, a section 66 of the upper part of each outside runner member beside the adjacent wheel is hinged, or otherwise made displaceable, which permits the entire wheel, when jacked up, to be accessible for removal of its tire, without need of removing the runner; while the saddle 26 of the runner may be used as the jack for this purpose. Normally the hinged portion is held in alignment with the outside runner member by means of swing clips 67 pivoted to the hinged portion and engaging the runner member.

In attaching my apparatus no part of the automobile is removed or changed.

It is necessary only to secure the front wheels in the lamps on the front runners, place the rear runners to embrace the rear wheels, and place and adjust the chains about the driving wheels. The chains may be made slack enough to pass over the wheels by releasing the slides which carry the tension sheaves and moving them forward in their guideways.

Adjustment of the rear runner for various snow conditions may be made by raising or lowering the saddle 26 which is adapted to engage the rear axle and limit the distance that the wheel will protrude below the runner shoe. When the chain is adjusted, suitable tension is applied to the chain, by the tension units, for causing it to be driven by the wheel forcibly enough to develop traction in soft snow, the saddle and its post cooperating to maintain the tension when the snow is both soft and deep by holding the runner away from the rear axle. In order to provide a rigid construction, the two rear runners are connected to one another at each end by suitable braces 68 bolted through the runners and rigidly secured by nuts, the pull rods 31 and 32 engaging the front bolts of each runner, and connecting the runners.

In the operation the car is steered by the front runners, the steering gear operating through the front wheels clamped to the runners. On hard going the automobile will run on the rear wheels and the rear runners will bear with only their weight on the ground, so that there will be little or no wear on the chain. In soft going, however, the rear runners will crowd down the snow, following the track of the front runners, and the traction of the rear wheels will be assisted by the long traverse of the chain from the front guide roll to the wheel, and further assisted by the stretch of chain from the wheel to the rear guide roll. In practice I find that the smooth tire shoe will give sufficient traction to move the chain properly but obviously, if a non-skid tire is used, the protuberances thereof will drive the chain more positively.

What I claim and desire to secure by Letters Patent is:

1. The combination with an automobile, of a sleigh attachment consisting of runners supporting and secured to the front wheels and adapted to steer the automobile; a runner for each rear wheel, having a sliding surface and side portions between and below which the wheel protrudes when the automobile is arranged as a sleigh, the runner being provided with a guide roller in the line of tractive effort of the wheel, around which and the wheel passes a chain engaging directly with and being driven by the tire of the wheel and having a stretch extending beneath the sliding surface of the runner.

2. The combination of an automobile having a driving wheel and an axle on which said wheel is supported, of a runner, a saddle or chair connected with said runner rising therefrom and loosely embracing said axle for detachably connecting the runner with the automobile, a guide pulley on the runner in the line of tractive effort of the wheel and a traction fabric passing around said pulley and the wheel engaing directly with and driven by the tire of the latter and having a stretch extending along the bottom of the runner and under the wheel.

3. The combination with an automobile having a driving wheel, of a runner arranged beside said driving wheel and so engaged with the automobile as to support the same in soft snow, with the driving wheel protruding below the ground engaging surface of the runner, a flexible traction fabric of greater length than the circumference of the wheel passing both over and under the latter and being constructed with transverse elements adapted to embrace and engage and be driven by the tire of the wheel, said transverse elements having such a short dimension radially of the wheel as to permit the wheel to run and support the automobile on a hard ground surface, and a guide pulley mounted on the runner approximately in the line of tractive effort of the wheel around which also the traction fabric passes, said pulley being located to guide a lower stretch of the fabric along the bottom surface of the runner.

4. An automobile having driving wheels in combination with runners extending beside said driving wheels to the front and rear thereof and being detachably connected to support the automobile in soft snow, with the wheels protruding below their undersurfaces, a traction fabric comprising two longitudinal endless chains of greater length than the circumference of the wheels and flexible cross chains attached to said longitudinal chains adapted to conform to the transverse curvature of the wheel tire and to be driven thereby, and a guide pulley carried by the runner in the line of tractive effort of the wheel, said traction fabric passing around said pulley and the wheel and having a stretch extending along and below the under surface of the runner.

5. The combination of an automobile having a driving wheel adapted to run on the ground and an axle on which said wheel is supported, of a runner, a saddle or chair connected with said runner and embracing said axle for detachably connecting the runner with the automobile, a guide pulley on the runner in the line of tractive effort of the wheel, a tractor fabric passing around said pulley and the wheel and having a stretch extending along the bottom of the runner and under the wheel, means for adjusting said chair up and down whereby to cause protrusion of the wheel to a greater or less distance below the runner when the runner rests on snow, and means for adjustably taking up the slack in the upper stretch of the tractor fabric between the wheel and said pulley.

6. The combination with an automobile having a driving wheel and an axle on which said wheel is mounted, of a runner having connected members extending on opposite sides of the wheel both to the front and to the rear thereof, a chair or saddle mounted upon the inner member of the runner and engaged with the axle, and means for adjusting said chair up or down, whereby to raise or lower the wheel with respect to the runner, the outer runner member having a displacable section in its upper part beside the wheel adapted by its displacement to permit changing of the tire on the wheel.

7. An automobile having front and rear axles and driving wheels mounted by one of said axles, runners flanking each of the driving wheels, a forked chair mounted on each of said runners by means of a post which is adjustable up and down, and receiving the driving wheel axle, and tie rods attached to the other axle and to the ends adjacent thereto of the respective runners.

8. An automobile sled comprising the combination with the driving road wheels of an automobile, of runners extending beside the said driving wheels to the front and rear thereof and being detachably connected to support the automobile in soft snow, with the wheels protruding below the under surfaces of said runners, a traction fabric comprising two longitudinal endless chains of greater length than the circumference of the wheel and cross chains attached to said longitudinal chains, and guide pulleys on the runner in front and in rear of the driving wheel, said traction fabric passing around said guide pulleys and the wheel and providing a stretch extending from one guide pulley to the other along the undersurface of the runner in contact with the under side of the wheel.

9. An automobile having driving wheels, tires on said wheels adapted to run on the surface of the ground, combined with runners cooperating with said wheels, supports between said runners and the automobile structure arranged to hold the runners at a minimum distance away from such structure, with the under surfaces of the runners above the tread points of the wheels when such runners bear on soft snow, a guide pulley on each runner in the line of tractive effort of the adjacent wheel, an endless flexible traction fabric passing around said pulley and wheel and being in driving engagement with both the upper and lower sides of the wheel, and a tension controller mounted upon each runner arranged to bear downwardly on the upper stretch of the traction fabric between the wheel and the pulley, whereby to take up the slack of said fabric and increase the extent of its circumferential engagement with the wheel.

In testimony whereof I have affixed my signature.

FRANCISCO O. ESTES.